A. HUETTER.
EXPANSIBLE CORE.
APPLICATION FILED JUNE 7, 1921.

1,404,959.

Patented Jan. 31, 1922.

INVENTOR.
Andrew Huetter
BY
A. L. Walker
ATTORNEY.

UNITED STATES PATENT OFFICE.

ANDREW HUETTER, OF DAYTON, OHIO, ASSIGNOR TO THE ALLSTEEL RIDEWELL TIRE AND RUBBER COMPANY, OF DAYTON, OHIO, A CORPORATION OF OHIO.

EXPANSIBLE CORE.

1,404,959.          Specification of Letters Patent.          Patented Jan. 31, 1922.

Application filed June 7, 1921. Serial No. 475,585.

*To all whom it may concern:*

Be it known that I, ANDREW HUETTER, a subject of the former Emperor of Austria, residing at Dayton, in the county of Montgomery and State of Ohio, have invented certain new and useful Improvements in Expansible Cores, of which the following is a specification.

This invention relates to molds for plastic material, and more particularly to an expansible core or air bag for use in the manufacture and repair of pneumatic tires for vehicles and like articles.

The object of the invention is to simplify the structure as well as the means and mode of operation of such expansible cores, whereby they will not only be cheapened in construction, but will be more efficient in use, positive in operation, uniform in action of increased durability and unlikely to get out of repair.

In the manufacture of vehicle tire casings and like articles, it is the practice to build the tire casing about a suitable core or mandrel and subsequently during the curing operation of the tire casing within the mold or matrix to subject the tire casing to internal pressure. The most general practice has been the use of elastic air bags made of fabric or rubber, or these materials in combination. However, the life or period of use of such elastic or expansible air bags has been quite short due to their deterioration under the heat of repeated vulcanizing operations. Under the influence of repeated heating they lose their elasticity and become hardened and set in form and therefore useless. For this reason, expansible metallic air bags or cores are to be preferred. To this end the present invention pertains to an expansible air bag or core made from flexible but inextensible sheet material, preferably but not necessarily metal. It is obvious that various compositions and substances possessing heat resistant characteristics capable of flexing action under pressure may be substituted for sheet metal. One of the primary objects of the present invention is to so arrange such core or segmental form as to effect uniform expansion throughout its length.

With the above primary and other incidental objects in view as will more fully appear in the specification, the invention consists of the features of construction, the parts and combinations thereof and the mode of operation or their equivalents as hereinafter described and set forth in the claims.

Figure 3:
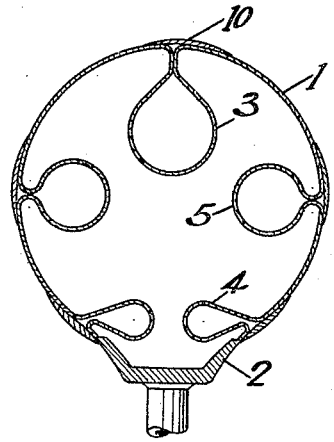
Figure 1:
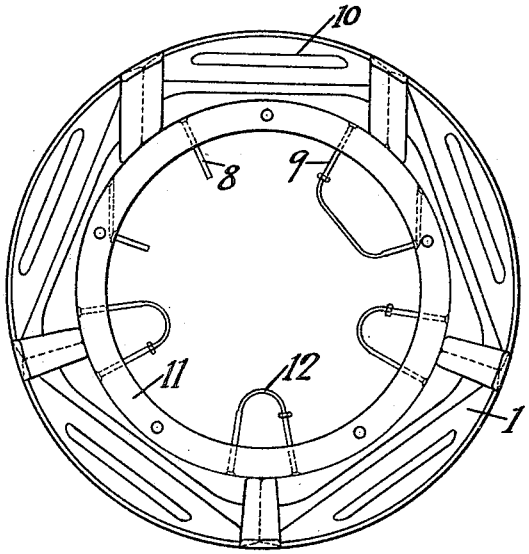
Figure 2:
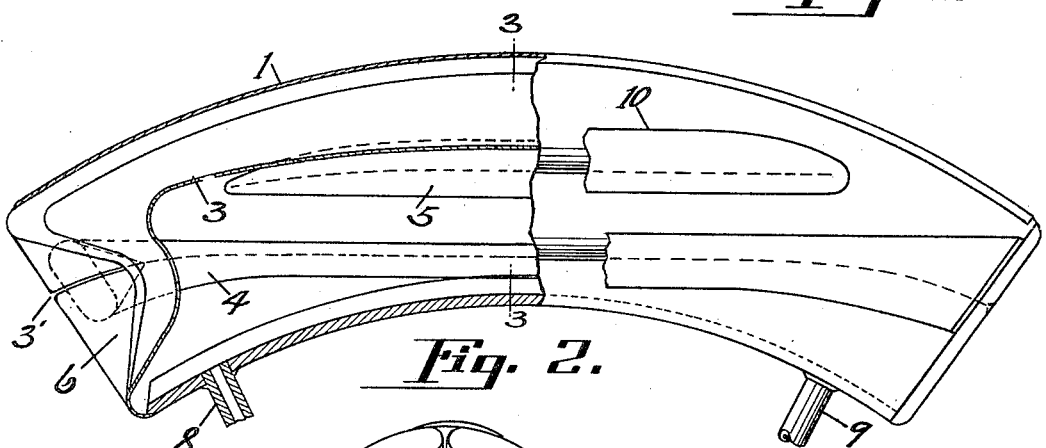
Figure 4:
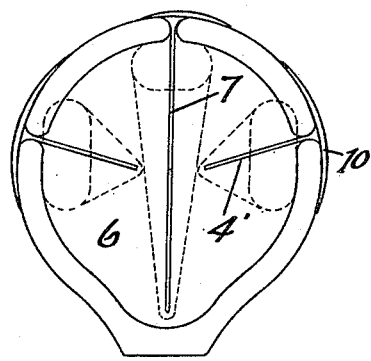

Referring to the drawings, Fig. 1 is a side elevation of an assembled expansible core upon which the vehicle tire is built and later stretched during the vulcanizing operation. Fig. 2 is a side elevation of one of the segmental units, partly in section. Fig. 3 is a transverse sectional view of the segmental units on line 3—3 of Fig. 2. Fig. 4 is an end elevation.

Like parts are indicated by similar characters of reference throughout the several views.

As heretofore constructed, expanding tire cores of the character herein shown and described have depended for their elasticity upon expansion joints or reentrant folds or plaits, having curvilinear form agreeing substantially with the curvature of the shell. While such shells have been found efficient and successful, in operation, there is a slight restraint or resistance to the opening or yielding movement of these expansion joints of curvilinear form, which is sought to be overcome in the present instance by making the expansion joint or fold substantially straight throughout its length and hence substantially equivalent to a chord in relation with the arcuate shell or core.

The expanding core units or sections forming the subject matter hereof comprise arcuate hollow shells 1, each preferably provided at its inner circumference or concave face with a reinforced or thickened wall as at 2, forming a non-yielding or resistant inner side. The cross sectional contour of the unit conforms approximately to the interior outline of the tire casing to be produced. The segmental unit is formed from flexible but intensible material preferably through not necessarily of sheet metal, but which in lieu thereof may be frictioned canvas, rubberized canvas, fiber, composition, hard rubber or other material, which possesses the necessary characteristics of being flexible and yielding under pressure, heat resistant and inextensible.

The arcuate tubular shell 1 is provided in its peripheral and side walls with a plurality of longitudinally disposed re-entrant flexible expanding plaits or folds 3—4—5. These re-entrant expanding joints extend as nearly straight as is conveniently and practically possible. Theoretically these joints should be straight. However, a reasonable degree of curvature will not necessarily destroy the function or beneficial result of the invention and any curvature less than that of the unit itself will increase the resiliency and yielding flexibility of the device. The unit 1 is provided at its opposite end with closures or heads 6 of indented or concave form. The peripheral re-entrant fold or plait 3 is substantially straight or cord-like with reference to the arcuate shell on its inner fold or edge, the ends of such plait or fold being extended inwardly diametrical across the conoidal heads 6 of the unit as shown at 3'. The continuation 3' of the fold or plait 3 is tapered and extends entirely across the closure head from the outer to the inner side thereof. The entrance slot to this fold or plait 3 in the exterior or peripheral surface of the unit is likewise continued diametrically across the head as indicated at 7, in Fig. 4. The lateral folds or plaits 4 likewise extend from end to end of the unit 1 in substantially straight lines. These folds 4 as they approach the opposite heads of the unit are somewhat flared, or tapered and continue thence radially across the head or closures 6 as indicated at 4'. These radially disposed continuations of the plaits or folds 4 are likewise tapered but terminate in spaced relation with the center of the head and in proximity to the diametrically disposed tapered fold or plait 3'. Due to the curvature of the shell or unit 1, the end of the re-entrant folds or plaits 4 are situated somewhat above the center or transverse diameter of the shell while at the center of the shell, due to the arcuate form thereof, these plaits or folds approach quite closely to the bottom or inner circumference of the arcuate shell. This relative variation of position at the ends and center of the unit will be at once apparent from a comparison of Figs. 3 and 4, and is clearly shown in Fig. 2. The comparatively equal spacing of the folds or plaits 3 and 4 adjacent to the ends of the unit afford substantially uniform expansion of the extremities of the unit. However, the passage of the fold or plait 4 so closely to the bottom or inner circumference of the unit at the center thereof and in such widely spaced relation with the peripheral fold or plait 3 does not afford the same degree of elasticity or expansion at the center of the unit. To compensate for this difference, the folds or plaits 5 are provided intermediate the peripheral fold or plait 3 and the lateral plait 4. The plaits 5, one of which is located at each side of the unit do not, however, extend the full length thereof, but are somewhat tapered in opposite direction and vanish before reaching the closure heads 6.

The plaits 5 being somewhat larger medially and tapering toward their opposite end, tend to equalize the elasticity or expansion of the unit by compensating for the variation of expansion throughout the length of the unit, afforded by the plait or fold 4. The latter as before explained, affords greater flexibility or elasticity at the ends of the unit than in the center. Two folds 4 and 5 coact to produce substantially uniform expansion throughout. Like the plaits 4, the folds or inturned plaits 5 are also substantially straight throughout bearing the relation of chords to the arcuate form of the unit. Each unit is provided with an inlet conduit 8 and an outlet conduit 9 for fluid under pressure, such as steam, air, water or other expanding medium. The internal pressure to which the unit is subjected tends to open up or expand the folds or plaits to materially increase the transverse circumference of the unit. The continuation of the fold or plait across the closure head 6 enable these heads to expand in unison with the side walls of the unit so that the expansion is uniform throughout the length of the core. To preserve a substantially uniform smooth exterior surface under various degrees of expansion of the core guard strips or flaps 10 are provided. These guards strips or flaps are fixedly attached to the wall of the unit at one side of the entrance slot to the fold or plait and extend thence across such entrance slot and overlap the adjacent wall upon the opposite side thereof. Thus these guard strips or flaps bridge the entrance slot or opening to the folds or plaits when the latter are expanded. The free edge of such guard strip or flap is preferably reduced to a feather edge whereby it easily merges into the outline of the core unit. The individual core units may be employed separately for the repair of tire casings or shoes or may be assembled into a complete annulus for the manufacture of new tire casings. Heretofore tires have usually been built over a solid or non-expansible core from which they are removed and an inflatable air bag placed therein to afford the required expansive pressure. In the present instance the tire is built over the expanding core heretofore described, which is subsequently employed as the air bag. To this end, the complete core or annulus comprises a series of succession of the arcuate segmental units as before described, arranged end to end in a continuous series. Lap joints are provided between successive core units to prevent the compression or crowding of the tire material between the units. These lap joints may be socket members provided on each unit in which the end of the succeeding unit is seated as shown in my co-pending application Serial No. 450590, or they may be independent separable joint bands as disclosed in my issue Patent No. 1368631.

In such assembly the core units or sections are supported in assembled relation by means of supporting rings 11 concentric with and positioned within the annulus formed by the section or unit and engaging the fluid pressure inlet and outlet conduits 9 and 10. The outlet conduit of one unit is preferably connected to the inlet conduit of the succeeding unit by an intermediate union 12 to afford a continuous circulation of the expanding medium whether the same be air, steam, water or other fluid under pressure, throughout the entire series of units. By this means, each unit is subjected to uniform pressure, and the degree of expansion will be substantially equal throughout the entire annulus.

From the above description it will be apparent that there is thus provided a device of the character described possessing the particular features of advantage before enumerated as desirable, but which obviously is susceptible of modification in its form, proportions, detail construction, and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. An expansible core for tires and the like comprising a hollow arcuate body of flexible but inexpansible material, terminal heads in said body, and a plurality of expansion joints extending in substantially straight alinement from end to end of the arcuate body and thence radially in the opposite heads thereof.

2. An expansion core for tires and the like comprising a hollow arcuate body of flexible but inexpansible material, a plurality of longitudinally disposed expansion joints extending from end to end of the body and intermediate expansion joints of less length and the arcuate body terminating in spaced relation with the ends of the core.

3. An expansion core for tires and the like comprising a hollow arcuate body of flexible but inexpansible material, a plurality of expansion joints therein affording uniform expansion throughout their length, said expansion joints being arranged in opposition whereby the expansion of one joint compensates for lack of expansion of another joint to insure substantially uniform expansion throughout the length of the arcuate body.

4. An expansion core for tires and the like comprising a hollow arcuate body of flexible but inexpansible material, expansion joints therein comprising reentrant folds extending from end to end of the body, said plates being gradually enlarged toward their ends.

5. An expansion core for tires and the like comprising a hollow arcuate body of flexible but inexpansible material, expansion joints therein comprising reentrant folds of less length than the arcuate body, said plaits being oppositely tapered, being largest at their medial portion and tapering toward their ends.

6. An expansion core for tires and the like comprising a hollow arcuate body of flexible but inexpansible material, expansion joints therein comprising two oppositely tapered reentrant folds each complementary of the other to afford substantially uniform expansion throughout the length of the arcuate body.

7. An expansion core for tires and the like comprising a hollow arcuate body of flexible but inexpansible material, and a substantially straight reentrant fold in the lateral wall of said body occupying the relation of a chord to the arcuate form of said hollow body.

8. An expansion core for tires and the like comprising a hollow arcuate body of flexible but inexpansible material, and a substantially straight reentrant fold positioned as the chord of the arcuate hollow body, said fold being oppositely tapered.

9. An expansion core for tires and the like comprising a hollow arcuate body of flexible but inexpansible material, and a substantially straight reentrant fold positioned as the chord of the arcuate hollow body, the ends of said fold being flared.

10. An expansion core for tires and the like comprising a hollow arcuate body of flexible but inexpansible material, and a substantially straight reentrant fold positioned as the chord of the arcuate hollow body, the opposite ends of the fold being convergently tapered.

11. An expansion core for tires and the like comprising an arcuate hollow body of flexible but inexpansible material, and a plurality of expansion joints therein, the joints being of different lengths and possessing varying degrees of expansion throughout their lengths, said joints being arranged in such relation as to equalize the expansion of the arcuate body.

12. An expansion core for tires and the like comprising an arcuate hollow body of flexible but inexpansible material, and a plurality of expansion joints therein, said joints being substantially straight and disposed as chords of the arcuate form of the body, the joints being arranged in such relation that variations of expansion of one joint is compensated for by variations of expansion of a second joint.

In testimony whereof, I have hereunto set my hand this 31st day of May, A. D. 1921.

ANDREW HUETTER.

Witnesses:
G. C. HELMIG,
H. M. CLINE.

Certificate of Correction.

It is hereby certified that in Letters Patent No. 1,404,959, granted January 31, 1922, upon the application of Andrew Huetter, of Dayton, Ohio, for an improvement in "Expansible Cores," errors appear in the printed specification requiring correction as follows: Page 1, line 96, for "intensible" read *inextensible;* page 3, line 62, claim 3, for the word "uniform" read *ununiform;* same page, line 75, claim 4, for the word "plates" read *plaits;* and that the said Letters Patent should be read with these corrections therein that the same may conform to the record of the case in the Patent Office.

Signed and sealed this 4th day of April, A. D., 1922.

[SEAL.]

KARL FENNING,
*Acting Commissioner of Patents.*